(12) United States Patent
Clarke

(10) Patent No.: US 8,024,979 B2
(45) Date of Patent: Sep. 27, 2011

(54) INDICATING FASTENER LOADING

(76) Inventor: Ronald C. Clarke, Phoenix, AZ (US)

( * ) Notice: Subject to any disclaimer, the term of this patent is extended or adjusted under 35 U.S.C. 154(b) by 161 days.

(21) Appl. No.: 12/426,729

(22) Filed: Apr. 20, 2009

(65) Prior Publication Data

US 2009/0301383 A1    Dec. 10, 2009

Related U.S. Application Data

(63) Continuation-in-part of application No. 11/467,011, filed on Aug. 24, 2006, now Pat. No. 7,520,174.

(51) Int. Cl.
*F16B 31/02* (2006.01)
(52) U.S. Cl. .......................................... 73/761; 73/760
(58) Field of Classification Search .............. 73/760–761
See application file for complete search history.

(56) References Cited

U.S. PATENT DOCUMENTS

| | | | |
|---|---|---|---|
| 2,600,029 A | 6/1952 | Stone | |
| 2,995,033 A | 8/1961 | Stifano, Jr. | |
| 3,561,260 A | 2/1971 | Reynolds | |
| 3,823,639 A | 7/1974 | Liber | |
| 3,943,819 A | 3/1976 | Charron | |
| 3,954,004 A | 5/1976 | Orner | |
| 3,964,299 A | 6/1976 | Johnson | |
| 3,987,668 A | 10/1976 | Popenoe | |
| 4,428,240 A | 1/1984 | Schoeps | |
| 4,676,109 A | 6/1987 | Wallace | |
| 4,686,859 A | 8/1987 | Wallace | |
| 4,823,606 A | 4/1989 | Milecki | |
| 4,899,591 A | 2/1990 | Kibblewhite | |
| 4,934,884 A | 6/1990 | Rooke | |
| RE33,490 E | 12/1990 | Steinbock | |
| 5,058,439 A * | 10/1991 | Carpenter | 73/862.21 |
| 5,291,789 A * | 3/1994 | Walton | 73/761 |
| 5,385,054 A * | 1/1995 | Kramer | 73/761 |
| 5,388,463 A | 2/1995 | Scott | |
| 5,392,654 A * | 2/1995 | Boyle | 73/761 |
| 5,584,627 A | 12/1996 | Ceney et al. | |
| 5,668,323 A * | 9/1997 | Waxman | 73/761 |
| 6,204,771 B1 | 3/2001 | Ceney | |
| 6,892,585 B2 * | 5/2005 | Clarke | 73/761 |
| 7,520,174 B2 * | 4/2009 | Clarke | 73/761 |

FOREIGN PATENT DOCUMENTS

SU    1742654    6/1992

\* cited by examiner

*Primary Examiner* — Max Noori
(74) *Attorney, Agent, or Firm* — Zagorin O'Brien Graham LLP

(57) ABSTRACT

An amplified indication of the elongation of a fastener is provided for determining instantaneous loading conditions of a fastener. A load indicator is couplable to a fastener for instantaneous load measurement and includes a housing defining a fastener interface configured to removably couple the housing to a fastener. A moveable datum probe extends from the housing in contact with a datum rod anchored within an internal bore of the fastener. A first lever is pivotally mounted within the housing and is moveable in response to displacement of the datum probe. A load display indicates a degree of loading of a fastener as a function of displacement of the datum probe. A second lever can be used to further amplify the reading from the displacement of the datum probe. An inclined visual scale and a multi-faceted lens allows for viewing of loading values from multiple directions or angles.

22 Claims, 7 Drawing Sheets

INDICATING FASTENER LOADING

CROSS-REFERENCE TO RELATED APPLICATIONS

This application is a continuation-in-part of U.S. application Ser. No. 11/467,011 filed on Aug. 24, 2006, which is incorporated herein by reference in its entirety.

FIELD OF INVENTION

This invention generally relates to load indicating, and more particularly, to visually representing and reading loading of fasteners and fastenings.

BACKGROUND OF THE INVENTION

Fasteners are used in a wide variety of applications, such as mills, motors, railroad tracks, flange assemblies, petrochemical lines, foundations, drag lines, power turbines and studs on cranes and tractors. In many applications, achieving the proper fastener loading (tension) and maintaining this loading once the system is placed in service can be problematic. Monitoring the load on a fastener during installation and service can be equally problematic.

As a fastener is continually tightened, the load increases until the fastener ultimately yields, breaks, or its integrity is otherwise compromised. Thus, overtightening a fastener can lead to catastrophic failures. Conversely, fasteners typically experience some loss of tension in service due to, for example, a variety of in-service occurrences including: relaxation (thread embodiment), vibration loosening, compressive deformation in the joint or flange, temperature expansion or contraction, etc. Loss of tension from these occurrences can cause misalignment or premature wear in a bolted assembly, leakage (in applications where the fastener is used for sealing), or catastrophic joint failure due to excessively high loads on other members of the assembly.

In certain applications, knowledge of a fastener load, upon installation and over time, is desirable for avoiding the potentially dangerous consequences of a compromised or loosened fastener, such as slippage, wear, leakage and/or possible failure. In other applications, for example when working with a group of bolts around a flange of a sealed assembly, it is important to evenly tighten the group of bolts. By uniformly tightening a group of bolts or studs to an appropriate load, and maintaining this load over time, potential failures are less likely to be experienced.

Determining the tensile load of conventional fastener often entails cumbersome methods to check the tightness of each bolt, such as loosening and re-tighten all of the fasteners regardless of whether such re-tightening is needed. The retorquing (i.e. tightening) of a fastener, however, induces wear and strain in the fastener system. Additionally, corrosion, friction, variations in nut condition, and the like can cause variations in torque values and introduce error into tensile load measurements.

One earlier proposed load indicating fastener, which is the subject of U.S. Pat. No. 5,668,323 issued Sep. 16, 1997 to Cory S. Waxman and incorporated herein by reference, includes a single pivot lever positioned within a bore in the fastener head with the actuator end of the pivot lever in contact with a reference post or datum rod seated or formed in the end of the bore and an indicator end of the pivot lever being visible at the head of the fastener.

Other proposed methods often require costly tools or readers or special training. For example, electronic or ultrasonic methods for determining tensile loads require experienced operators, expensive equipment, clean surfaces and records of pre-installation test values for each bolt or stud. In addition, such systems may be adversely affected by shock and other extreme conditions.

Accordingly, improvements are sought in the monitoring of loading in fasteners.

SUMMARY OF THE INVENTION

The details of one or more embodiments of the invention are set forth in the accompanying drawings and the description below. Other features, objects, and advantages of the invention will be apparent from the description and drawings, and from the claims.

One aspect of the invention features, in combination, a fastener and load indicator for measuring an axial tensile load on the fastener. The combination includes a fastener including a head defining a reference surface and a load indicator interface, and a shank defining, with the head, a central bore. A datum rod is anchored at a first end within the central bore and extends along the central bore to a second free end positioned adjacent the reference surface of the fastener head. A load indicator housing defines a fastener interface configured to releasably couple the load indicator to the load indicator interface on the head of the fastener. A datum probe extends from the housing and is configured to be displaced by the datum rod as the load indicator is coupled to the fastener via the fastener interface. A first lever having first and second ends and being pivotally coupled to the load indicator housing and moveable in response to displacement of the datum probe. A load display retained by the housing is responsive to movement of the lever to indicate the loading of the fastener as a function of the displacement of the datum rod, datum probe and first lever.

In some implementations, a second lever is pivotally connected within the housing and cooperates with the first lever such that the load display is responsive to combined movement of the first and second levers.

In some cases, an end of the second lever is a pointer movable along a visual scale.

In some implementations, a spring biases the pointer towards one end of the visual scale.

In some implementations, the load display includes a pointer movable along a visual scale.

In some implementations, a multi-faceted lens in the housing for configured to allow viewing of the load display from multiple substantially orthogonal views. In some cases, the visual scale is multifaceted or inclined.

In some implementations, the load display is at least one of an electrical signal, an audible signal and a light signal.

In some implementations, the interfaces couple the indicator to the fastener via at least one of a snap fit, interference fit, threaded fit, and magnetic attraction.

In some implementations, the interfaces are configured to align the datum probe with the free end of the datum rod.

In some cases, a first end of the first lever serves as the datum probe.

In some cases, second end of the first lever serves as a moveable pointer.

Another aspect of the invention features a load indicator removably couplable to a fastener for instantaneous load measurement. The indicator includes a housing defining a fastener interface configured to removably couple the housing to a fastener. A moveable datum probe extending from the housing, the fastener interface configured to align the datum probe with a datum rod of a fastener. A first lever is pivotally mounted within the housing and is moveable in response to displacement of the datum probe. A load display is configured to indicate a degree of loading of a fastener as a function of displacement of the datum probe.

In some implementations, the load display includes a visual scale and a pointer associated with the first lever.

In some implementations, a first end of the lever is the pointer and a second end of the lever is the datum probe.

In some implementations, the first lever is configured to produce a first amplified response to movement of the datum probe.

In some implementations, a second lever is associated with the first lever to produce a second amplified response to movement of the datum probe.

In some implementations, a spring biases the first lever towards one end of the visual scale.

In some implementations, the fastener interface is configured to attach to a complimentary feature on the fastener by at least one of a snap-fit, interference fit, threaded connection and magnetic attraction.

In some implementations, the indicator is further configured to maintain a measured load value on the load display after removal of the indicator from a fastener.

In some implementations, the load display includes one of an audible signal generator and a light generator.

One aspect of the invention features a fastener or bolt configured with a load gauge and a load indicator or gauge reader configured with a probe responsive to displacement of the load gauge. The bolt and load indicator are separably or removably coupled during load readings via complementary indexing interfaces on the bolt and load indicator.

In some implementations, the load indicator includes a housing defining a bolt indexing interface and a datum probe extending from the housing adjacent the bolt indexing interface. The datum probe is moveable to cause a pointer to move along a visual scale visible on or through the housing. In some cases the pointer is visible through a multi-faceted viewer window in the housing.

In some cases the datum probe acts on a series of levers to move the pointer along the scale. In some cases, the datum probe is a first end of a first lever and the pointer is a second end of a second lever, the first and second levers moveable about pivots with a second end of the first lever cooperating with a first end of the second lever.

In some cases the datum probe and pointer are opposite ends of a lever.

In some implementations, the fastener or bolt includes a head and a shank and central bore defined in the head and shank. A datum rod is anchored within the central bore in the fastener. The fastener head defines a reference surface and a load indicator indexing interface. A free end of the datum rod moves relative to a reference surface on the fastener head upon loading and elongation of the fastener. In some cases, a portion of the reference surface also serves as the load indicator indexing surface. The load indicator indexing interface on the fastener head and the bolt indexing interface on the load indicator provides for alignment and/or temporary mounting of the load indicator atop the fastener.

As the load indicator is pressed onto the bolt head, until the bolt indexing interface engages the load indicator indexing interface, the datum probe of the load indicator is progressively pushed into the load indicator housing. A gap defined between the free end of the datum rod and the reference surface is translated into a measurement of fastener loading via the corresponding movement of the datum probe, levers and pointer. Thus, the pointer moves along the visual scale of the load indicator in proportion to the displacement of the datum probe, which corresponds to the gap produced between the reference surface and datum rod as a result of fastener loading.

In some implementations, the datum probe is a ball bearing displaceable within in a journal and contacting the first lever.

In some implementations, the load indicator housing includes a multifaceted lens over the visual scale and pointer, to permit reading of loading values at both a load indicator end and load indicator side or from a combined angle. In some cases, the visual scale includes multiple scales, each separately viewable through different facets of a load indicator lens in a housing window, or through separate load indicator housing windows.

In some cases, movement of the datum probe is translated electronically into a visual indication of fastener loading, e.g., via an LCD display.

In some cases, the gap between the datum rod and reference surface can be additionally or alternatively measured using sonic, optical, or resistance measurements or other non-contact gap measuring techniques.

In some implementations, the indexing interfaces of the fastener and load indicator include cooperative releasably engageable features. In some cases, the interfaces together include a snap fit coupling. In some cases, the interfaces together include an interference fit coupling. In some cases, the interfaces together include a threaded coupling. In some cases, the interfaces together include a seated coupling. In some cases, the interfaces together include a quick connect coupling like those found on air tools. In some implementations, the load indicator indexing interface of the fastener includes a recess and the fastener indexing interface of the load indicator includes a projection or shoulder. Any number or combination of couplings can be used to align and removably secure the load indicator on the fastener.

In some implementations, the load indicator includes first and second cooperating levers, each having first and second ends. The first free end of the first lever serves as the datum probe and the second free end of the second lever serves as the pointer. The levers are pivotally retained on pivot pins within the load indicator housing. A spring or other biasing device serves to bias one or more of the levers in a particular direction. For example, in some cases, a spring biases the cooperating levers such that the pointer rests adjacent the 100% portion of the visual scale. As the load indicator is mounted on the fastener, the datum probe contacts the datum rod and moves the pointer down the visual scale to the appropriate percentile load indicator.

In some cases grease is provided around the datum rod within the central bore. In some cases, a removable cap is provided over the datum rod and central bore when the load indicator is not attached. For example, the cap can be retained on the fastener head via a coupling similar to that used to retain the load indicator.

In some implementations, the load indicator includes a lock configured to maintain the pointer in a fixed position along the visual scale for reading after removal of the load indicator from the fastener. In some cases, a second moveable indicator accompanies the pointer along the visual scale in a first direction but remains subsequently fixed along the scale to provide an indication of the reading obtained prior to separation of the load indicator. The second indicator can then be reset adjacent the pointer for a subsequent reading.

In some implementations, the load indicator can be coupled to the fastener independent of a particular rotational orientation, i.e., the interfaces together provide for a wide range of orientations. In other implementations, the indexing interfaces require more precise positioning of the load indicator on the fastener head. For example, a series of complementary projections and detents may allow for only a finite number of discrete orientations.

In some cases, the load indicator is provided with seals around any housing openings to prevent intrusion of moistures.

In some cases, the use of multiple levers provides for amplified pointer response while allowing the load indicator housing to be of a compact construction. For example, the load indicator housing can be constructed to be generally not substantially larger in diameter than the fastener head or even than the central bore of the fastener. Use of multiple levers provides amplified lever end responses within an overall narrower range of movement than would a single lever. In some applications with large industrial fasteners, the load indicator housing is significantly smaller in diameter than the fastener head.

In some implementations, the load indicator is configured to be further connected to a power tightening tool to facilitate automatic shut-off of the tool upon reaching a certain loading, as indicated by the load indicator. For example, the load indicator can provide an electrical signal corresponding to the movement of the datum probe and the tool can be configured to shut-off upon detection of a predetermined electrical signal value.

In some cases, the load indicator is positioned within a driver on the tool such that the load indicator and driver are simultaneously pressed onto the fastener.

In some implementations, a light source is provided adjacent the visual scale and pointer to allow for low light readings. In some cases, the light source is an LED powered by a battery. In some cases, the light source is a phosphorescent coating on at least one of the pointer and the visual scale.

In some implementations, the load indicator includes multiple different indexing interfaces for coupling to multiple different sized fasteners. In some cases, one size of load indicator indexing interface is used on many different sizes of fasteners to allow use of one load indicator on a wide range of fastener sizes.

In some implementations, the load indicator includes an audible signal or light generator. The audible signal or light generator can be set to activate when a detected loading is within a predetermined range. Alternatively, it can activate when a detected loading falls outside an acceptable range, for example, when the fastener is overloaded or insufficiently loaded.

In some implementations, the load indicator includes a magnet to help maintain the load indicator in indexed engagement with the fastener head. In some case, the magnet forms part of the fastener indexing interface.

In some implementations, the load indicator can be more permanently coupled to a fastener to provide ongoing loading measurements. For example, the load indicator can be snap fit or interference fit onto a fastener head for periodic readings or can be threaded onto the fastener head to provide ongoing measurements. Thus, the load indicator can be removably, semi-permanently, or effectively permanently attached to the fastener to provide a desired frequency of readings.

In some cases, the load indicator housing is machined from aluminum or steel. In other cases, the load indicator housing is molded from plastic. In some cases the levers are stamped from steel sheets and secured within the housing via steel pivot pins. A spring is connected between one end of a lever and the housing to bias the pointer towards a position on the visual scale.

In some cases, the visual scale is provided on an incline to permit viewing from multiple angles. In other cases, the visual scale is provided along adjacent angled surfaces to permit viewing from multiple angles.

In some cases the indicator includes a sensor for sensing said displacement of the datum probe and translating the displacement into a readable signal. In some cases, the sensors one of a displacement transducer and a pressure transducer.

Multiple levers within the load indicator may cooperate to indicate the load on the fastener by amplification of the elongation experienced by the fastener. A multi-lever design may provide a visible range of pointer movement even with a significantly reduced indicator diameter and a reduced indicator depth.

Aspects of the invention provide an innovative method and apparatus for visually determining tensile loading during tightening and throughout the life of a fastener. In accordance with one aspect of the invention, a first lever is connected at a lower internal pivot point within an indicator and a second lever is connected at an upper pivot point of the indicator. The lower end of the first lever rests upon a datum rod anchored within a fastener, while the upper end of the second lever serves as a pointer adjacent a visual scale.

A lower end of the datum rod is anchored within a bore in the fastener while the upper free end of the datum rod terminates even with or a fixed distance from a top surface of the fastener head. As the fastener is tightened, the fastener is elongated causing the free end of the datum rod to be drawn or displaced further into the internal fore of the fastener. The datum probe is displaced as a function of displacement of the datum rod free end, which causes the pointer end of the second lever to move relative to a visual scale. Conversely, loss of fastener tension, the datum rod causes the levers to return toward their original positions.

In accordance with further aspects of the invention, the load indicator may be incorporated into the fastener itself. For example, a cartridge carrying the two levers may be assembled and calibrated within the fastener using multiple fasteners around the perimeter of the cartridge or, alternatively, using threads formed on the perimeter of the cartridge. Various embodiments may include a seal between the cartridge and fastener to protect the load indicator from water, chemicals, dirt, and other environmental conditions. To periodically verify proper calibration, the device may be partially disengaged and slowly returned to the operating position to verify proper movement of the indicator.

Use of two levers to shift part of the amplified response to the second lever reduces the range of movement of the first lever and the degree of clearance required for the first lever. For in-fastener embodiments, this significantly reduces the dimensions of the section of the fastener bore required to accommodate the amplified lever response. Additional advantages afforded by the present invention include increased sensitivity of the load indicator, a reduction in the overall length of load indicator and in the depth of the bore.

BRIEF DESCRIPTION OF THE DRAWINGS

Like reference symbols in the various drawings indicate like elements.

DETAILED DESCRIPTION

Figure 1A:
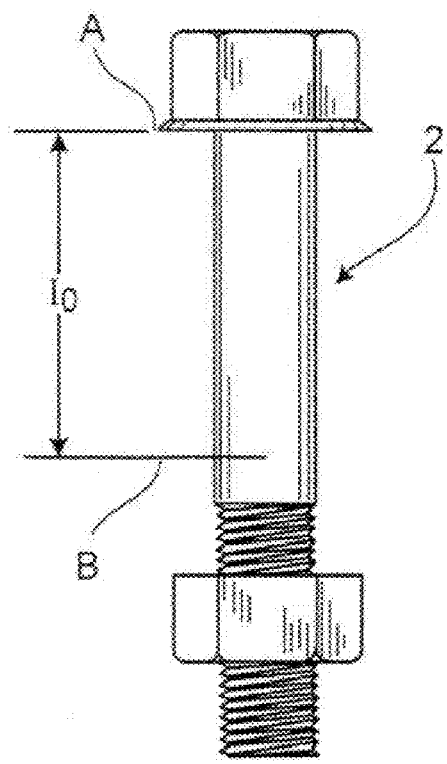
FIG. 1a is an prior art fastener without an applied load.

The following description is of example implementations of the invention only, and is not intended to limit the scope, applicability or configuration of the invention. As will become apparent, various changes may be made in the function and arrangement of the elements described in these implementations without departing from the scope of the invention as set forth herein.

In accordance with various aspects of the invention, a load indicator includes a housing or "cartridge" housing or connecting various indicator elements. The housing or cartridge may be temporarily mounted to the head of a fastener or may be permanently mounted within a fastener bore to measure the tensile load of the fastener. The cartridge includes first and second moveable members or "levers" that interact to provide an amplified response to the elongation of the fastener to provide a visual indication along a visual scale.

While described here in the example context of a bolt, it should be appreciated that a load indicator may be used with any fastener, for example, studs, pins, dowels, jack bolts, thread stock, and/or the like may incorporate aspects of the present invention. Thus, a fastener, as used herein, means any securing device or structure capable of elongation in response to an applied force.

The term "lever" as used herein, refers to any rigid or substantially rigid member having a portion configured to be moveable relative to a reference point or "pivot" in response to movement of another portion of the lever. Thus, suitable levers may be of any shape or size and may be configured and associated with a pivot in any manner to achieve a desired lever movement.

Similarly, "pivot" as used herein, generally may be construed to mean any fulcrum or reference by which actuation of a first portion of a lever causes movement of an opposing second portion of the lever. For example, the pivot may be a pin positioned to obtain a specific amplification ratio of the movement of the second lever portion in response to movement of the first lever portion. Similarly, the lever lengths and pivot points of the levers may be selected to achieve a combined amplification ratio.

In general, in accordance with various aspects of the present invention, elongation of a fastener causes multiple interoperable levers to display an indication of the tensile load on a visual scale. The indicator may be used to establish the proper initial loading of a fastener or to monitor the subsequent loading of the fastener. That being said, implementations are described herein in the context of torquing or tightening a fastener to the proper loading.

In accordance with various embodiments, one or more of the levers may be biased to return one or more of the levers to a default position. For example, in various embodiments, the pointer end of the second lever is biased toward the maximum load portion of the visual scale. In the context of an in-fastener indicator, the cartridge is inserted into a central bore of the fastener until contact with a datum within the bore moves the levers and pointer to the no load portion of the visual scale. Thus, subsequent elongation of the bolt would distance the reference from the pivot of the first lever returning the indicator end of the second lever proportionately towards the maximum load portion of the visual scale.

In the context of a removable load indicator, the load indicator housing/cartridge is temporarily mounted to the head of the fastener by aligning or indexing a fastener interface on the indicator with an indicator interface on the fastener. As the indicator is mounted to the fastener, a datum probe extending from the load indicator contacts a datum rod anchored within a bore in the fastener causing the pointer at the end of the second lever to move proportionately along a visual scale. The indicator may be snap-fitted, interference-fitted, threaded onto, magnetically attached or otherwise accurately positioned on the fastener to ensure accurate readings.

Figure 1B:
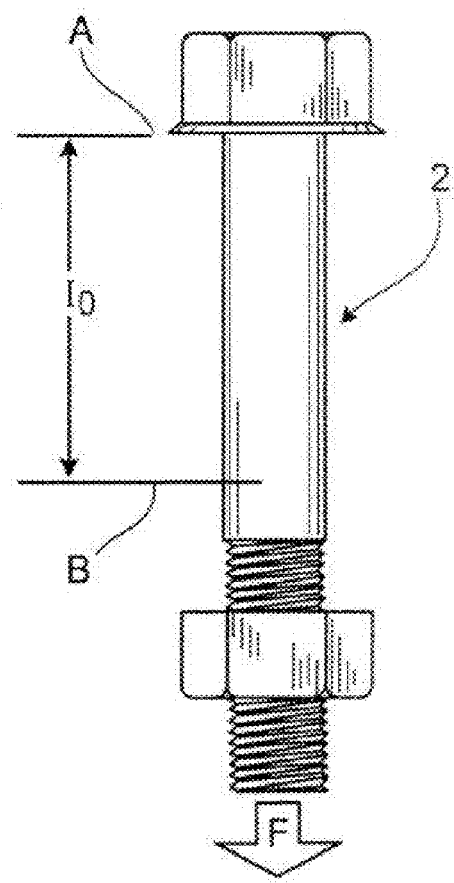
FIG. 1b is an prior art fastener with an applied load.

With reference now to FIGS. 1a and 1b, conventional fasteners 5 are shown in an unloaded state and in a loaded state. As appreciated by those skilled in the art, a force F applied to fastener 2 causes fastener elongation that is proportional to the force (F) applied. Elongation of fastener 2 adheres to Hooke's law, which dictates that elongation is directly proportional to the load applied to fastener 2. For example, in FIG. 1a, an initial distance 1.sub.0 is defined between Point A adjacent the bolt head and Point B located a predetermined distance from Point A on the shank. With reference to FIG. 1b, as a force F is applied, fastener 2 is elongated such that the distance between Points A and B (as shown in FIG. 1b) is greater than 1.sub.0, namely, as depicted, the distance 1 between Points A and B. As those skilled in the art will appreciate, 1−1.sub.0=Δ.1 and Δ.1 is proportional to F, where F is the force which is applied to fastener 2.

As will be appreciated, Δ.1, will vary depending upon the specific section of fastener 2 that is analyzed. For example, the elongation in the upper portion of the fastener will tend to be different than that in the lower i.e. threaded portion of the fastener. However, within a given region, the percent elongation is substantially constant over that region. As will be described in greater detail herein below, the percent elongation over the upper region of the fastener, such as shown in FIGS. 1a and 1b, is utilized in determining the load that is applied to the fastener. The indicator provides a visual indication of clamp load status during tightening and throughout the life of fastener 2.

Figure 2:
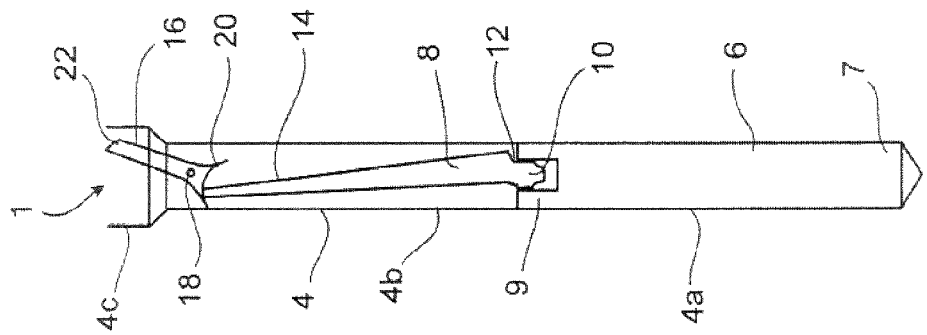
FIG. 2 is a schematic diagram of a cut-away view of a bore of a fastener housing a single-lever in-fastener prior art load indicating assembly.

With reference to FIG. 2, a schematic diagram shows a cut-away view of an in-fastener single lever load indicator 1 within an elongated internal bore 4 of a fastener, including bore sections 4a, 4b, and 4c extending from the head of the fastener to a lower internal point. Bore section 4a extends into the shank or yieldable portion of the fastener and is configured to receive a reference datum rod 6 configured to act upon a single elongated lever 8 disposed in bore section 4b. Lever 8 is moveable within bore 4 about a pivot 10 in response to movement of datum rod 6 during elongation of the fastener. The dashed lines indicate the resting position 5 of lever 8 prior to elongation of the fastener and the corresponding solid lines indicate the elongation position 7 of lever 8. As a first end 12 of lever 8 moves in contact with datum rod 6 a second end 14 of lever 8 produces an amplified response, moving second end 14 between position 5 and position 7. Section 4*c* is configured to accommodate the amplified range of movement of second end 14. Thus, a smaller, less visible movement of datum rod 6 within bore 4 is converted into a larger, more visible movement at second end 14 of lever 8.

With the single lever configuration shown in FIG. 2, the depth and diameter of bore section 4*c* is determined by the desired amplified range of movement of second end 14 and the length of lever 8. For example, for the range of movement of second end 14 to travel a full half inch visual scale, the diameter of section 4*c* must be substantially equal to one half inch. The depth of section 4*c*, in turn, must be sufficient to provide clearance for movement of the remaining length of lever 8. Single lever indicators have proven very reliable and effective but have typically been limited to use in fasteners having larger shanks or thicker heads due to the required depth of bore section 4*c*. Thus, use of multiple levers provides for a significantly shallower bore section 4*c* to enable use of load indicator 1 in fasteners having smaller diameter shanks and smaller heads.

Figure 3:
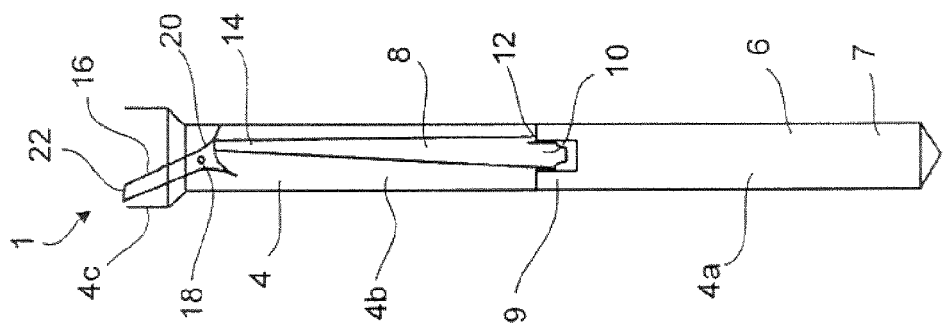
FIG. 3 is a schematic diagram of a cut-away view of a bore of a loaded fastener housing a dual-lever in-fastener load indicating assembly according to one embodiment.

With reference to FIG. 3, a cut-away view is shown of a load indicator 1 having a first lever 8 within bore section 4*b* and a second lever 16 disposed within bore section 4*c*. First end 12 of lever 8 engages datum rod 6 disposed in bore section 4*a* causing lever 8 to respond to movement of datum rod 6 during elongation of the fastener. Datum rod 6 may be integral to the fastener or may be a separate component inserted into bore section 4.

A datum rod 6 comprises a post 7 configured to extend a predetermined distance into section 4*a* in the shank of the fastener. Different lengths of post 7 may be used to enable use of a standard size of load indicator 1 with various lengths of fasteners having various lengths of bore 4. Datum rod 6 further includes an annular rim 9 about the top of post 7. Pivot 10 and any portion of lever 8 may extend into the opening in the center of annular rim 9. Annular rim 9 serves to contact first end 12 of lever 8 independent of the orientation of load indicator 1 within bore 4. It is understood that datum rod 6 may include any other suitable feature for engaging lever 8 and may be configured for a particular orientation of load indicator 1 within bore 4. Datum rod 6 may anchored at its lower end in section 4*a* and substantially free along the length of post 7 to convey elongation of bore 4 to load indicator 1.

With continued reference to FIG. 3, a second lever 16 is disposed within bore 4 and is moveable about second pivot 18. A first end 20 of second lever 16 is responsive to movement of second end 14 of lever 8 causing corresponding movement of a second end 22 of second lever 16. First end 20 may be configured to engage lever 8 in both directions. Alternatively, second lever 16 may be biased in one direction and moveable in a second direction in response to movement of lever 8.

Second lever 16 may be sized and configured to provide any desired degree of response to movement of lever 1. For example, second pivot 18 may be positioned at the midpoint of second lever 16 or may be shifted towards one end to further amplify the response of second lever 16. For example, both levers 8 and 16 may produce amplified responses, with the sum response being significantly greater than that provided by a single lever of comparable length. Second lever 16 is depicted with second pivot 18 positioned adjacent first end 20 of second lever 16 to provide an amplified response at second end 22 of second lever 16. Bore section 4*c* is sized to accommodate the amplified response movement of second lever 16.

Comparison of FIGS. 2 and 3 demonstrates advantage provided by aspects of the present invention with in-fastener mounting regarding the depth of bore section 4*c*. By limiting the range of movement of lever 8 to the smaller diameter of bore section 4*b* and shifting the broader amplified response to second lever 16, the degree of clearance required for lever 8 is significantly reduced and the depth of section 4*c* is likewise significantly reduced. Additional advantages afforded by aspects of the present invention include increased sensitivity of load indicator 1, a reduction in the overall length of load indicator 1 and in the depth of bore 4. Further advantages included increased manufacturing efficiency, less loss of fastener material to bore 4, and compatibility with smaller or more conventional fasteners. A multi-lever configuration provides similar advantages in separable indicators. For example, the indicator housing or cartridge may be made more compact for use in tighter areas or with smaller fasteners while allowing for use of wrenches or other tools to tighten the fastener.

Figure 4:
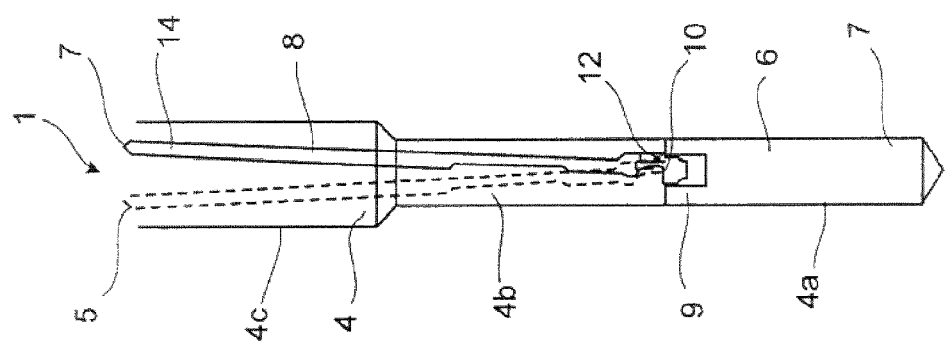
FIG. 4 is a schematic diagram of a cut-away view of the fastener bore and load indicating assembly of FIG. 3 without a load.

With reference to FIG. 4, a schematic diagram of a cut-away view of the load indicator of FIG. 3 is shown with levers 8 and 16 in a second position corresponding to maximum elongation of the fastener as well as to the default position of levers 8 and 16 prior to insertion into bore 4. During installation and calibration of load indicator 1 in bore 4 of a fastener, datum rod 6 is first installed in bore section 4*a* and load indicator 1 is then press-fitted or threaded into bore 4 or is otherwise secured to the fastener. Additional methods of attaching load indicator 1 to a fastener are described with reference to FIGS. 5-6.

Load indicator 1 is advanced within bore 4 until first end 12 of lever 8 contacts datum rod 6. Load indicator 1 is further advanced until the second end 22 of second lever 16 indicates zero load on a visual scale associated with second lever 16. It is understood that any number of load indicator components may be suitably independently or jointly installed and adjusted to achieve calibration of load indicator 1. As datum rod 6 moves due to elongation of the fastener, second end 22 of second lever 16 travels along the visual scale to indicate the corresponding elongation or loading conditions.

Calibration of load indicator 1 may be performed by loading an associated fastener in a hydraulic testing fixture to apply a predetermined load while monitoring the response of load indicator 1. Levers 8 and 16 may be replaced or modified as needed to obtain proper calibration of load indicator 1. For example, lever 8 may be replaced with a lever having a slightly different amplification ratio to achieve a desired amplified response. Once load indicator 1 exhibits the desired amplified response, it may be locked within bore 4 to maintain proper calibration.

With reference to FIG. 5A, second end 22 of second lever 16 is moveable along a visual scale 26 within a bezel 28. Visual scale 26 may be viewed from top of the fastener through a protective transparent lens secured within bezel 28. Visual scale 26 includes percentage markings indicating a range of proof loads. Any suitable indication may be used with visual scale 26, including percentages, fractions, letters, numbers, colors, and the like. A "0%" marking indicates some minimum load. The location of the "100%" designation corresponds to a predetermined maximum acceptable load.

Load indicator 1 may be calibrated to about "0%," indicating that no clamp load forces are present when installed in an unloaded fastener. Calibration may be suitably accomplished by varying the position of load indicator 1 within the fastener or the configuration of any of the components within load indicator 1. Incremental markings on visual scale 26 suitably allow an indication of intermediate fastener loads. Alternatively, a separable load indicator 1 may be calibrated during temporary mounting on a test fastener.

As previously discussed, upon tightening of a fastener 2 associated with load indicator 1, fastener 2 experiences tensile loading and elongates according to Hooke's Law. Elongation of fastener 2 results in movement of datum rod 6 causing the amplified response of levers 8 and 16 thereby moving second end 22 towards the "100%" designation on visual scale 26. Upon loosening of fastener 2, fastener 2 experiences a reduction in tensile loading and shortens in length. The shortening of fastener 2 increases the pressure against lever 8 moving second end 22 towards the "0%" designation on visual scale 26.

In an alternative embodiment, load indicator 1 may include or be attached to an electronic circuit or other mechanism for initiating auto shut-off of a pneumatic tightening tool or other powered tool to prevent over-tightening. Load indicator 1 can also be attached electronically to a remote reader for automated monitoring of the clamp load status of a large number of fasteners 2.

Bezel 28 may further include a series of fastener openings 32 and 34. Openings 32 and 34 may be threaded to retain fasteners therein or may simply permit installation of a fastener to be threaded into the head of fastener 2 or the end of an indicator housing. For example, openings 32 permit installation of fasteners configured to secure bezel 28 to fastener 2 using threaded holes in the head of fastener 2. Openings 34 are threaded and retain set screws or locking fasteners for locking bezel 28 into position with respect to fastener 2 or other indicator housing. For example, fasteners in openings 32 may be tightened until load indicator 1 provides a zero load reading and may then be locked in this calibrated position by tightening fasteners in openings 34, thereby locking bezel 28 in the calibrated position.

Figure 5:
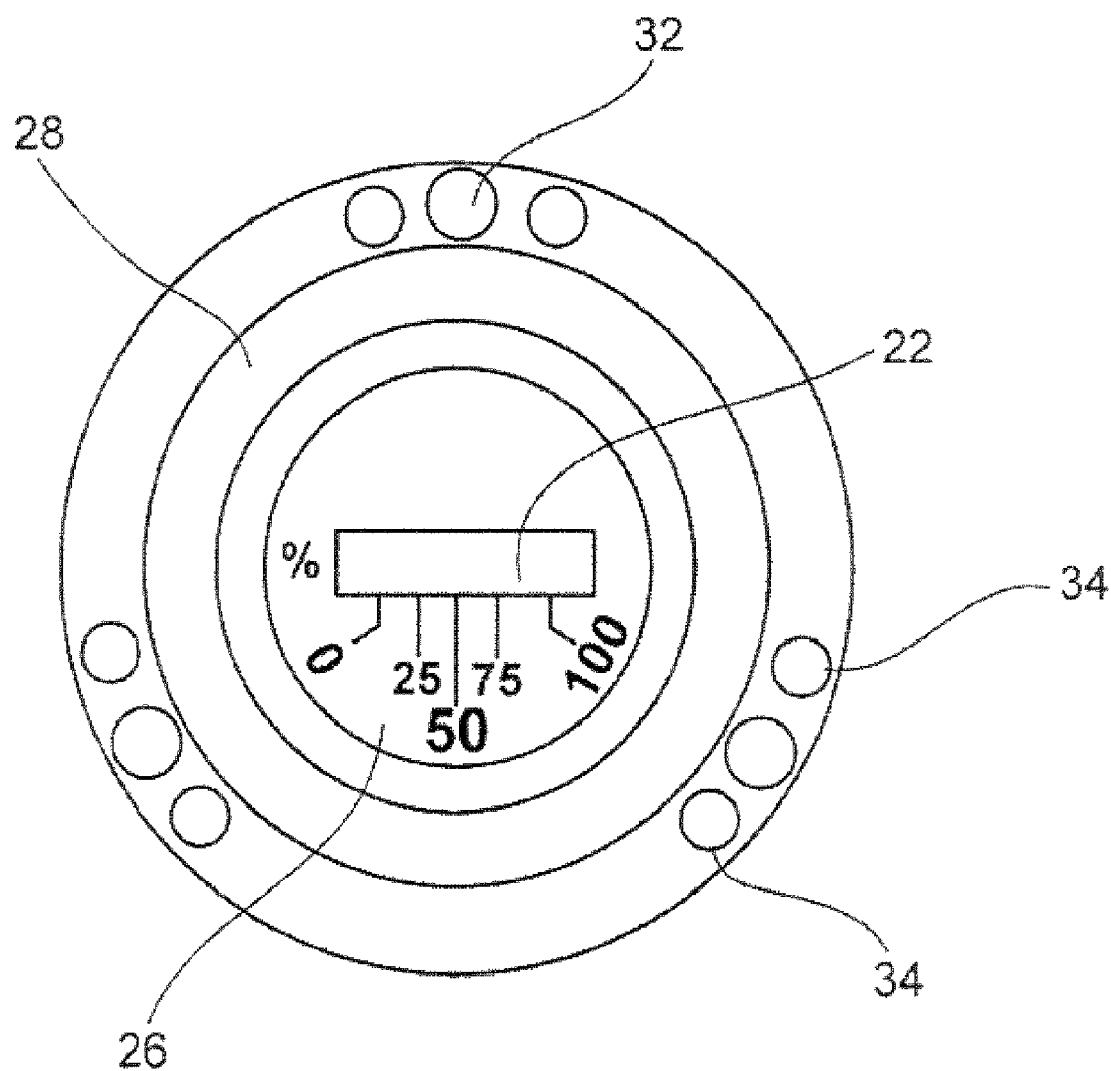
FIG. 5 is a top view of an load indicator visual scale and housing.
Figure 6A:
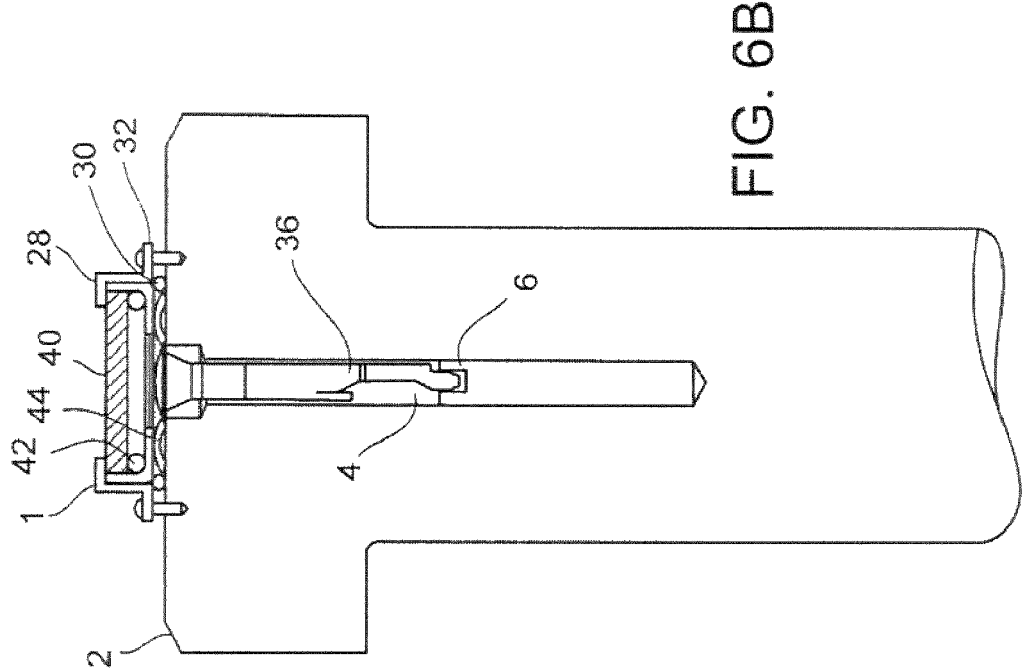
FIG. 6A is a schematic diagram of a cut-away view of a fastener providing in-fastener recessed cartridge mounting in accordance with one embodiment.
Figure 6B:
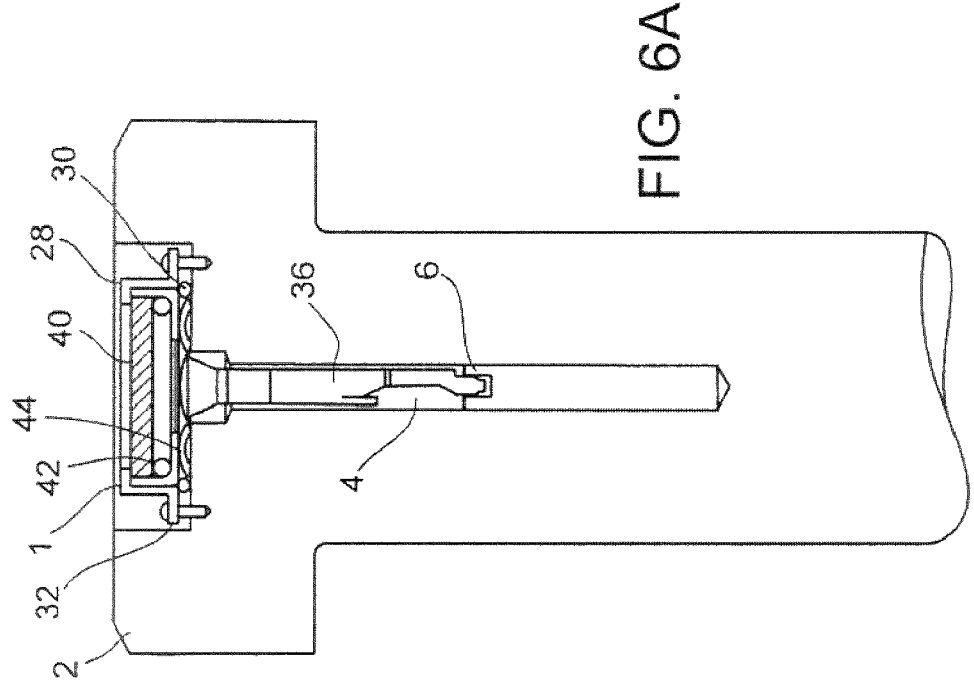
FIG. 6B is a schematic diagram of a cut-away view of an in-fastener flush-mounted cartridge in accordance with another embodiment.

With reference now to FIGS. 6A-6B, a schematic diagram of a cut-away view of the load indicator 1 of FIG. 5 is shown installed within fastener 2. In one implementation, load indicator 1 includes cartridge 36 configured for insertion into bore 4. Cartridge 36 retains pivots 10 and 18 securing levers 8 and 16 within bore 4. Cartridge 36 may further retain a spring for biasing one of levers 8 or 16 in a default position. Association of levers 8 and 16 and pivots 10 and 18 with cartridge 36 facilitates easy installation and removal of load indicator 1 from bore 4. Cartridge 36 is connected at its upper end to bezel 28.

Bezel 28 may be mounted in a recess in the head of fastener 2 as shown in FIG. 6A or on top of the head of fastener 2 as shown in FIG. 6B. In certain applications involving limited space requirements or high-impact conditions it may be advantageous for bezel 28 to be located flush with or below the top surface of the head of fastener 2. Alternatively, as described below, bezel 28 may be attached to an indicator housing to secure a bi-directional viewing window.

Load indicator 1 may further include a housing seal 30 and wave washer 44 between bezel 28 and fastener 2. Housing seal 30 serves to exclude water, dirt, and other contaminants from bore 4 and load indicator 1. Housing seal 30 may be omitted, for example, where load indicator is sealingly press-fitted into bore 4 or otherwise sealed within an indicator housing. Wave washer 44 serves to maintain resistance against the fasteners connecting bezel 28 to fastener 2. Bezel 28 may further retain a transparent lens 40 and lens seal 42. Lens 40 need not be flat, but may be concave, convex, curved, angled or otherwise shaped to provide viewing of visual scale 26. In various alternative embodiments, bezel 28, cartridge 36, or other components of load indicator 1 may serves to attach load indicator 1 to fastener 2. For example, bezel 28 or cartridge 36 may be press fitted into bore 4. Alternatively, cartridge 36 may be an enclosed housing as described below that is temporarily attached to fastener 2 to obtain a load measurement.

Figure 7:
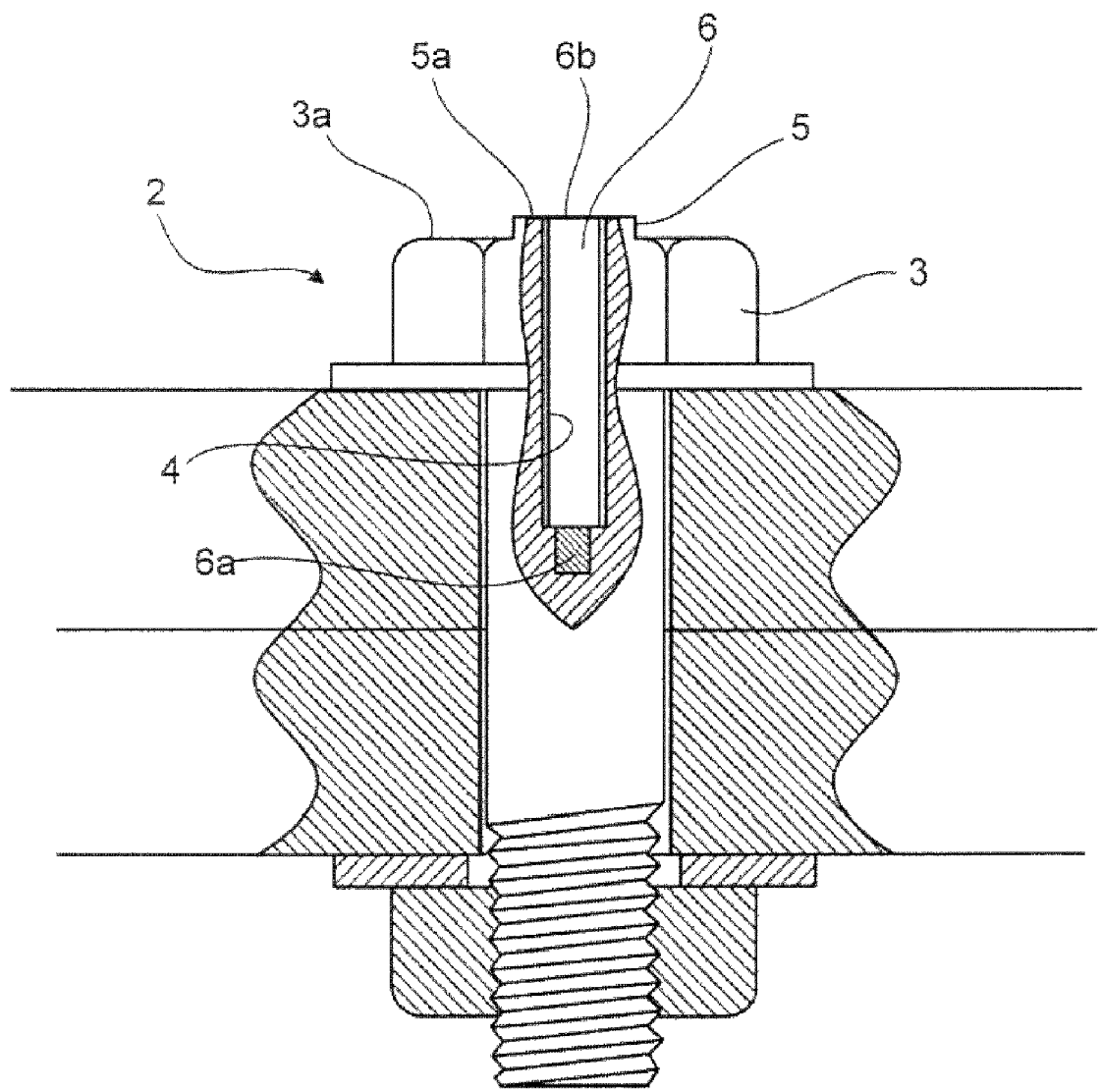
FIG. 7 is a schematic elevation view of an fastener configured for use with a load indicator according to one implementation.
Figure 9:
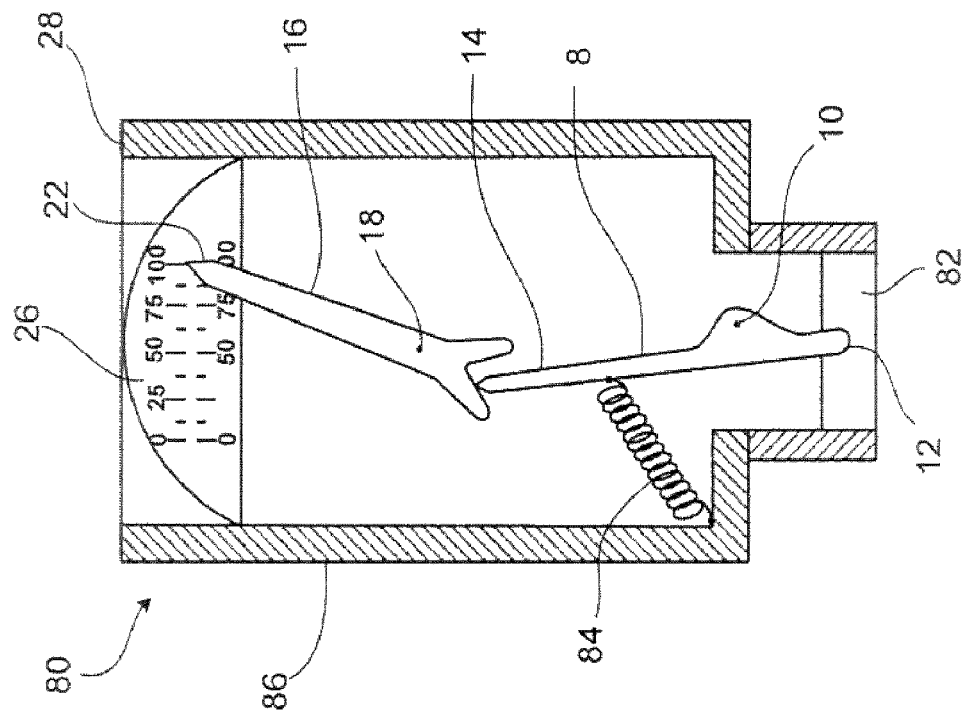
FIG. 9 is a sectional view of the load indicator of FIG. 8 along line A-A.
Figure 8:
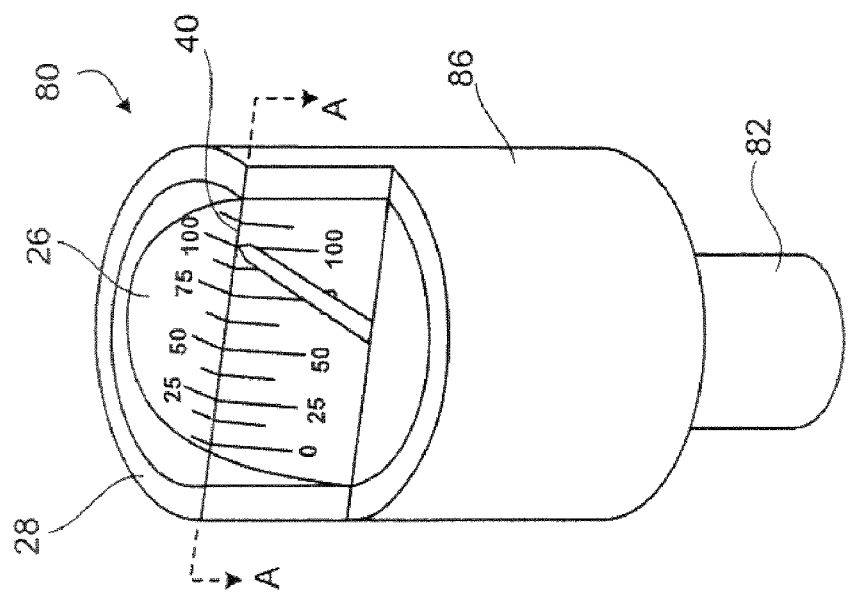
FIG. 8 is a perspective view of a load indicator for use with the fastener of FIG. 7 according to one implementation.
Figure 10:
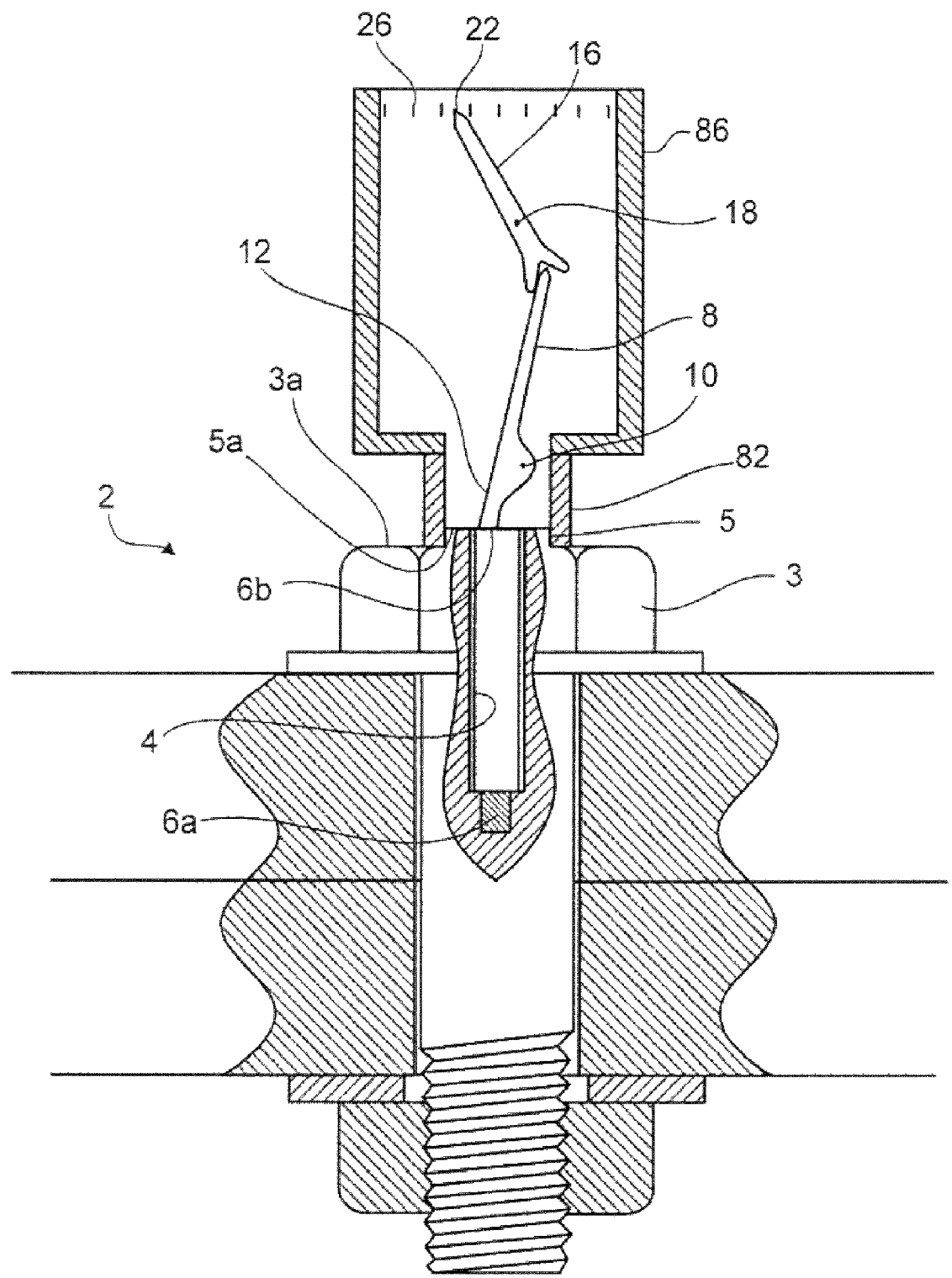
FIG. 10 is a side view of the load indicator of FIG. 8 coupled to the fastener of FIG. 7

With reference now to FIG. 7, a fastener 2 is configured for use with a separable tensile load indicator shown in FIGS. 8-9. Fastener 2 defines a central bore 4 extending from the head 3 of fastener 2 into the shank of the fastener. Datum rod 6 is anchored at a lower end 6a within bore 4. Head 3 of fastener 2 further defines a load indicator interface 5 for use as a reference surface and/or for use in aligning and/or temporarily mounting a load indicator on fastener 2. Top reference surface 5a of load indicator interface 5 and top reference surface 6b of datum rod 6 are coplanar when fastener 2 is in a non-loaded state. As fastener 2 is tightened, bore 4 is elongated drawing datum rod top surface 6b downward away from top surface 5a of load indicator interface 5. In other implementations the datum rod and reference surface are not necessarily coplanar and another predetermined unloaded relative positioning of the free end of the datum rod and the reference surface can be used.

With reference now to FIG. 8, a separable tensile load indicator 80 is configured to be detachably mountable to fastener 2 of FIG. 7. Load indicator 80 includes a sealed housing 86. Visual scale 26 is visible through lens 40 secured by bezel 28 atop housing 86. Load indicator 80 is mounted atop fastener 2 by a bolt indexing interface 82 configured to connect to load indicator interface 5 of fastener 2.

Bolt indexing interface 82 may be configured as a socket, clip, or other interface suitable to couple with load indicator interface 5. Interface 82 is shown in FIG. 9 as an annular rim constructed and arranged to engage load indicator interface 5 on fastener 2. It should be appreciated that interface 5 and interface 82 may be constructed and arranged in any manner suitable to properly index indicator 80 with fastener 2 for accurate readings.

For example, fastener 2 need not include a raised interface 5, but rather may include a recess or other suitable indexing feature. Any number of alignment or attachment features may be used to ensure proper alignment and attachment during use. For example, a key and slot combination feature may ensure proper alignment, while a snap fit collar feature may ensure full engagement and attachment prior to reading of load indicator 80.

FIG. 9 shows a sectional view of the separable tensile load indicator 80 of FIG. 8 taken along line A-A. Housing 86 houses first lever 16 moveably mounted at pivot 8 and responsive to movement of lever 8 attached at pivot 10. In this regard, housing 86 is similar to cartridge 36 described earlier. A spring 84 biases lever 8 or lever 16 towards one end of visual scale 26. For example second end 22 of lever 16, which extends over visual scale 26 as a moveable pointer, may be biased towards the 100% load end of visual scale 26.

First end 12 of lever 8 serves as a datum probe to contact top surface 6b of datum rod 6, causing lever 8 and interoperable lever 16 to move second end 22 of lever 16 down visual scale 26 to the appropriate corresponding load indication. Visual scale 26 may be positioned on an incline below a multi-faceted lens 40 so as to be visible both from the top and the side of housing 86. Lens 40 may be configured to provide magnification of visual scale 26.

Alternatively, first end 12 of lever 8 may rest in a default retracted position until extended into a reading position by a load indicator operator. Similarly, first end 12 of lever 8 may be associated with any number of additional datum probe elements, such as a ball bearing interposed in a journal between first end 12 and upper surface 6b during reading.

Thus, load indicator 80 may be used during installation or routine maintenance of fasteners to measure the tensile load or clamp force of a fastener. Use of a dual lever embodiment provides for a reduced indicator diameter and height for use in tight areas, or for ease of use, transportation, storage and manufacture. The angled lens 40 and inclined visual scale 26 enable observation of indicator readings from various angles.

A number of embodiments of the invention have been described. Nevertheless, it will be understood that various modifications may be made without departing from the spirit and scope of the invention. For example, three levers could be used to provide additional amplified response. For example, both a visual indication and an electrical signal can be provided in response to movement of the datum probe. Accordingly, other embodiments are within the scope of the following claims.

What is claimed is:

1. In combination, a fastener and load indicator for measuring an axial tensile load on the fastener, the combination comprising:
   a fastener including a head defining a reference surface and a load indicator interface, and a shank defining, with the head, a central bore;
   a datum rod having a first end anchored within the central bore and extending along the central bore to a second free end positioned adjacent the reference surface of the fastener head;
   a load indicator housing comprising a fastener interface configured to releasably couple the load indicator to the load indicator interface on the head of the fastener, such that the load indicator is substantially positioned outside the central bore;
   a datum probe extending from the housing and configured to be displaced by the datum rod as the load indicator is coupled to the fastener via the fastener interface;
   a first lever having first and second ends and being pivotally coupled to the load indicator housing and moveable in response to displacement of the datum probe; and
   a load display retained by the housing is responsive to movement of the lever to indicate the loading of the fastener as a function of the displacement of the datum rod, datum probe and first lever.

2. The combination of claim 1, further comprising a second lever pivotally connected within the housing and cooperating with the first lever and wherein the load display is responsive to combined movement of the first and second levers.

3. The combination of claim 2, wherein an end of the second lever is a pointer movable along a visual scale.

4. The combination of claim 3, further comprising a spring biasing the pointer towards one end of the visual scale.

5. The combination of claim 1, wherein the load display comprises a pointer movable along a visual scale.

6. The combination of claim 1, further comprising a multifaceted lens in the housing configured to allow viewing of the load display from multiple substantially orthogonal views.

7. The combination of claim 6, wherein the visual scale is multifaceted or inclined.

8. The combination of claim 1, wherein the load display is at least one of an electrical signal, an audible signal and a light signal.

9. The combination of claim 1, wherein the interfaces couple the indicator to the fastener via at least one of a snap fit, interference fit, threaded fit, and magnetic attraction.

10. The combination of claim 1, wherein the interfaces are configured to align the datum probe with the free end of the datum rod.

11. The combination of claim 1, wherein a first end of the first lever serves as the datum probe.

12. The combination of claim 1, wherein the second end of the first lever serves as a moveable pointer.

13. A load indicator removably couplable to a fastener for instantaneous load measurement, the indicator comprising:
   a housing defining a fastener interface configured to removably couple the housing atop a fastener;
   a moveable datum probe extending from the housing, the fastener interface configured to align the housing on the fastener head with the datum probe in contact with a datum rod of a fastener in use;
   a displacement gauge disposed within the housing and moveable in response to displacement of the datum probe; and
   a load display configured to indicate a degree of loading of a fastener as a function of displacement of the datum probe.

14. The indicator of claim 13, wherein the load display comprises a visual scale and a pointer associated with the displacement gauge.

15. The indicator of claim 14, wherein the displacement gauge comprises a first lever and wherein a first end of the lever is the pointer and a second end of the lever is the datum probe.

16. The indicator of claim 13, wherein the displacement gauge comprises a first lever configured to produce a first amplified response to movement of the datum probe.

17. The indicator of claim 16, further comprising a second lever associated with the first lever to produce a second amplified response to movement of the datum probe.

18. The indicator of claim 16, further comprising a spring biasing the first lever towards one end of the visual scale.

19. The indicator of claim 13, wherein the fastener interface is configured to attach to a complimentary feature on the fastener by at least one of a snap-fit, interference fit, threaded connection and magnetic attraction.

20. The indicator of claim 13, further configured to maintain a measured load value on the load display after removal of the indicator from a fastener.

21. The indicator of claim 13, wherein the load display includes one of an audible signal generator and a light generator.

22. The indicator of claim 13, wherein the datum probe is a ball bearing displaceable within a journal and contacting the displacement gauge.

* * * * *